United States Patent
Sol

(10) Patent No.: US 9,973,885 B2
(45) Date of Patent: May 15, 2018

(54) AVN TERMINAL AND CONTROL METHOD THEREOF

(71) Applicant: Hyundai Motor Company, Seoul (KR)

(72) Inventor: Un Hwan Sol, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 28 days.

(21) Appl. No.: 14/697,894

(22) Filed: Apr. 28, 2015

(65) Prior Publication Data

US 2016/0146624 A1 May 26, 2016

(30) Foreign Application Priority Data

Nov. 21, 2014 (KR) .................. 10-2014-0163183

(51) Int. Cl.
*H04W 4/02* (2018.01)
*G01C 21/36* (2006.01)

(52) U.S. Cl.
CPC .......... *H04W 4/02* (2013.01); *G01C 21/3605* (2013.01)

(58) Field of Classification Search
CPC .. G01C 21/3605; G01C 21/26; G01C 21/367; G01C 21/3697; H04W 4/02; G06Q 20/102; G06Q 30/0601; H04L 67/325; H04L 63/12; G09B 29/102; G06C 20/102; G06C 30/0601
USPC ................. 701/400, 419, 426, 467, 486–487
See application file for complete search history.

(56) References Cited

U.S. PATENT DOCUMENTS

| | | | |
|---|---|---|---|
| 8,498,991 B2 | 7/2013 | James et al. | |
| 2007/0032949 A1* | 2/2007 | Arai | G01C 21/00 701/420 |
| 2007/0210938 A1 | 9/2007 | Deurwaarder et al. | |
| 2012/0047208 A1* | 2/2012 | Kwon | H04M 1/72577 709/204 |
| 2014/0229107 A1* | 8/2014 | Didjusto | G01C 21/00 701/537 |
| 2016/0069699 A1* | 3/2016 | Chen | G01C 21/3682 701/426 |

FOREIGN PATENT DOCUMENTS

| | | |
|---|---|---|
| JP | 2005-235144 A | 9/2005 |
| JP | 2006-010551 A | 1/2006 |
| JP | 2008-164420 A | 7/2008 |
| JP | 2009-222503 A | 10/2009 |
| JP | 2010-038890 A | 2/2010 |
| JP | 2010-191503 A | 9/2010 |
| JP | 4802522 B2 | 10/2011 |
| JP | 2012-021788 A | 2/2012 |

* cited by examiner

*Primary Examiner* — Nga X Nguyen
(74) *Attorney, Agent, or Firm* — Mintz Levin Cohn Ferris Glovsky and Popeo, P.C.; Peter F. Corless

(57) ABSTRACT

A control method for an audio-video-navigation (AVN) terminal includes: receiving an identifier code and point of interest (POI) information; searching for user information corresponding to the identifier code from a communication connected terminal; and displaying the POI information and user information when the user information corresponding to the identifier code is identified during the searching.

12 Claims, 3 Drawing Sheets

AVN TERMINAL AND CONTROL METHOD THEREOF

CROSS-REFERENCE TO RELATED APPLICATION

This application claims priority to and the benefit of Korean Patent Application No. 10-2014-0163183, filed on Nov. 21, 2014, which is hereby incorporated by reference as if fully set forth herein.

BACKGROUND

Technical Field

The present disclosure relates to an audio-video-navigation (AVN) terminal and a control method thereof and, more particularly, to an AVN terminal for improved user convenience and a control method thereof.

Discussion of the Related Art

Recent rapid development of electronic control technology allows a variety of devices in a vehicle, which have conventionally been mechanically operated, to be electrically driven for the sake of driver convenience, driving safety, and the like. As such, vehicle systems are gradually advancing and becoming state-of-the-art.

In this regard, an audio-video-navigation (AVN) terminal may be incorporated in a vehicle to provide audio, video, and navigation functions. In addition, the AVN terminal may perform communication with a telematics unit via controller area network (CAN) communication, or may be integrally equipped with a telematics unit. In addition, the AVN terminal may be equipped with a display to provide visual information to a user. Generally, the AVN terminal provides a user with a function to guide the way to a destination.

The AVN terminal is often used to provide a function to guide the way to point of interest (POI) of a user. A POI refers to data related to a user destination. The AVN terminal guides the way to a given POI when a user inputs the POI, which benefits user convenience.

The AVN terminal may also communicate with a single mobile terminal via Bluetooth or universal serial bus (USB). In addition, the AVN terminal may communicate with a telematics center through a mobile communication network, and the telematics center may also communicate with another mobile terminal through a mobile communication network.

The AVN terminal may receive a POI from an external mobile terminal through a mobile communication network. Notably, upon receiving the POI, the AVN terminal may display insufficient information related to a subject that provides the POI, which may cause inconvenience for a user who uses the AVN terminal. Accordingly, there is a need to provide an AVN terminal offering improved user convenience.

SUMMARY

Accordingly, the present disclosure is directed to an AVN terminal and a control method thereof that substantially obviate one or more problems due to limitations and disadvantages of the related art.

An object of the present disclosure is to provide an AVN terminal capable of additionally displaying information related to a POI provider and a control method thereof. Additional advantages, objects, and features of the present disclosure will be set forth in part in the description which follows and in part will become apparent to those having ordinary skill in the art upon examination of the following or may be learned from practice of the disclosed embodiments. The objectives and other advantages of the embodiments may be realized and attained by the structure particularly pointed out in the written description and claims hereof as well as the appended drawings.

To achieve these objects and other advantages and in accordance with the purpose of the present disclosure, as embodied and broadly described herein, the disclosed embodiments provide a control method for an audio-video-navigation (AVN) terminal including: receiving an identifier code and point of interest (POI) information; searching for user information corresponding to the identifier code from a communication connected terminal; and displaying the POI information and user information when the user information corresponding to the identifier code is identified during the searching.

The receiving may include receiving the identifier code and the POI information from an external telematics center.

The receiving may include directly receiving the identifier code and the POI information from an external mobile terminal.

The searching may include searching for the user information corresponding to the identifier code based on information stored in a phonebook or phone database provided in the communication connected terminal.

The displaying may include providing the user information and the POI information via audio when the user information corresponding to the identifier code is identified during the searching.

The method may further include providing a service that guides a way to a POI indicated by the POI information upon receiving a command to guide the way to the POI.

The method may further include displaying the POI information when no user information corresponding to the identifier code is identified during the searching.

The identifier code may include at least one of a media access control (MAC) address, social networking service (SNS) ID, and telephone number of an external mobile terminal.

The user information may include at least one of a name, sex information, and birth date information of a user.

Furthermore, according to embodiments of the present disclosure, an AVN terminal includes: a display; a modem unit configured to receive an identifier code and POI information; and a controller configured to search for user information corresponding to the identifier code from a communication connected terminal and to control a display to display the POI information and user information when the user information corresponding to the identifier code is identified during the searching.

The controller may be further configured to receive the identifier code and the POI information from an external telematics center.

The controller may be further configured to directly receive the identifier code and the POI information from an external mobile terminal.

The controller may be further configured to search for the user information corresponding to the identifier code based on information stored in a phonebook or phone database provided in the communication connected terminal.

The controller may be further configured to provide a service that guides a way to a POI indicated by the POI information upon receiving a command to guide the way to the POI.

The AVN terminal may further include a head-up display (HUD), and the controller may be further configured to display the POI information and the user information via the HUD.

The controller may be further configured to control the display to display the POI information when no user information corresponding to the identifier code is identified during the searching.

The identifier code may include at least one of a media access control (MAC) address, SNS ID, and telephone number of an external mobile terminal.

The user information may include at least one of a name, sex information, and birth date information of a user.

Furthermore, according to embodiments of the present disclosure, a control method for an AVN terminal includes: receiving an identifier code and POI information; and displaying the POI information and user information when the user information corresponding to the identifier code exists.

The method may further include receiving the user information corresponding to the identifier code from a mobile terminal.

Furthermore, according to embodiments of the present disclosure, an AVN terminal includes: a display; a modem unit configured to receive an identifier code and POI information; and a controller configured to receive user information from an external mobile terminal. The controller is configured to control a display to display the POI information and user information when the user information corresponding to the identifier code exists.

Furthermore, according to embodiments of the present disclosure, a non-transitory computer readable medium containing program instructions for a control method for an AVN terminal includes: program instructions that receive an identifier code and point of interest (POI) information; program instructions that search for user information corresponding to the identifier code from a communication connected terminal; and program instructions that display the POI information and user information when the user information corresponding to the identifier code is identified during the searching.

Furthermore, according to embodiments of the present disclosure, a non-transitory computer readable medium containing program instructions for a control method for an AVN terminal includes: program instructions that receive an identifier code and POI information; and program instructions that display the POI information and user information when the user information corresponding to the identifier code exists.

It is to be understood that both the foregoing general description and the following detailed description of the present disclosure are exemplary and explanatory and are intended to provide further explanation of the embodiments as claimed.

BRIEF DESCRIPTION OF THE DRAWINGS

The accompanying drawings, which are included to provide a further understanding of the present disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
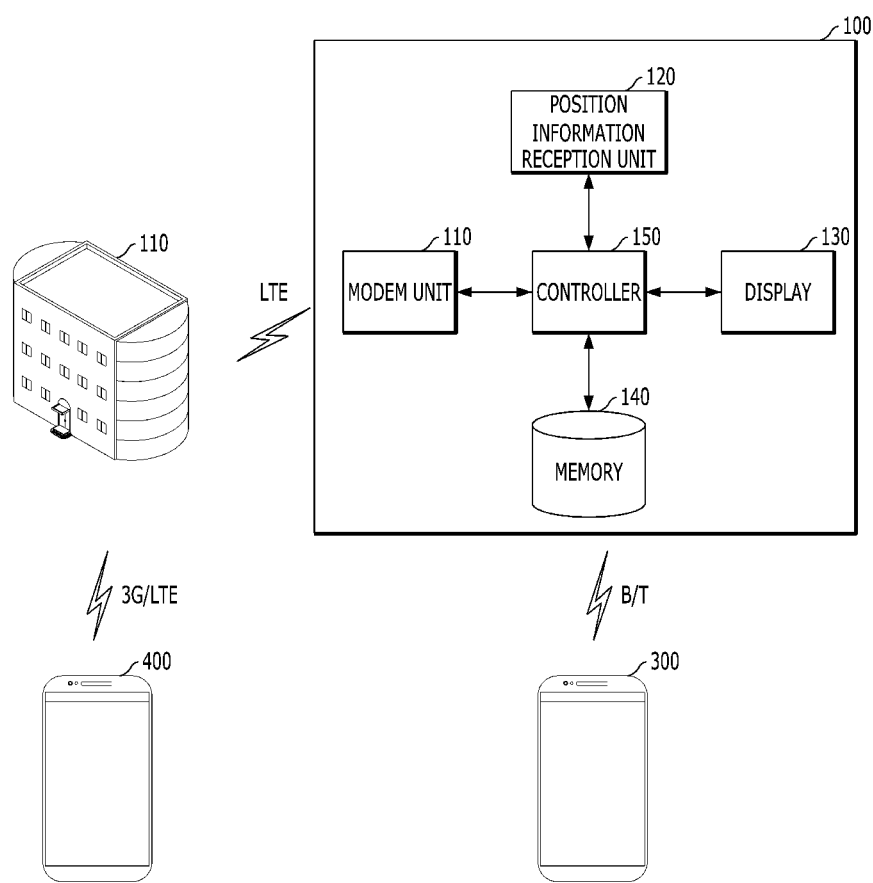
FIG. 1 is a block diagram of an AVN terminal according to embodiments of the present disclosure.

Hereinafter, reference will now be made in detail to the embodiments of the present disclosure, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" of elements herein are used for convenience of description and thus can be used interchangeably and do not have any distinguishable meanings or functions. In addition, in the following description of the embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents and substitutions included in the spirit and scope of the present disclosure.

The terms including "first," "second," and the like may be used to describe various elements, but the elements are not limited by the terms. The terms, if any, are used for distinguishing between one element and other elements.

It will be understood that when one element is referred to as being "connected to" or "accessed by" another element, one element may be "connected to" or "accessed by" another element via a further element although one element may be directly connected to or directly accessed by another element. On the other hand, it will be understood that when one element is referred to as being "directly connected to" or "directly accessed by" another element, there is no component between the mentioned elements. The singular forms are intended to include the plural forms as well, unless the context clearly indicates otherwise.

The term "comprises" or "has" described herein should be interpreted not to exclude presence or addition possibility of characteristics, numbers, steps, operations, constituent elements, parts or combinations thereof described in the specification but to designate presence of one or more other characteristics, numbers, steps, operations, constituent elements, parts or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor.

The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a block diagram of an AVN terminal according to embodiments of the present disclosure. As shown in FIG. 1, the AVN terminal 100 may perform communication with a telematics center 200. The AVN terminal 100 may perform communication with a first mobile terminal 300. The AVN terminal 100 may communicate with the first mobile terminal 300 via Bluetooth, Wi-Fi, Wi-Fi direct, or USB communication.

The AVN terminal 100 may include a modem unit 110, a position information reception unit 120, a display 130, a memory 140, and a controller 150. While the AVN terminal 100 is described herein as including the modem unit 110 and the position information reception unit 120, in some embodiments, the AVN terminal 100 may include a telematics unit (not shown) including a modem, a separate unit 110 and the position information reception unit 120. At this time, the AVN terminal 100 may perform communication with the telematics unit (not shown) via in-vehicle communication, such as controller area network (CAN) communication. In addition, the components shown in FIG. 1 may not be necessary to construct the AVN terminal 100 and the AVN terminal 100 as described herein may include a different number of components than the aforementioned components. In addition, the AVN terminal 100 may include an audio module (not shown) to provide audio through the audio module (not shown).

The AVN terminal 100 generally includes the display 130 disposed at a front interior region of a vehicle. In addition, the AVN terminal 100 provides audio, video, and navigation functions.

The modem unit 110 may include one or more modules to enable wireless communication between the AVN terminal 100 and a wireless communication system, between the AVN terminal 100 and another AVN terminal, or between the AVN terminal 100 and an external center. In addition, the modem unit 110 may include one or more modules to connect the AVN terminal 100 to one or more networks. While the modem unit 110 and the position information reception unit 120 have been described separately herein, in some embodiments, the modem unit 110 and the position information reception unit 120 may be incorporated in a telematics unit (not shown).

The modem unit 110 may perform communication with the telematics center 200. Generally, the modem unit 110 may perform communication with the telematics center 200 using wireless communication. The modem unit 110 may transmit and receive radio signals to and from at least one of a base station, an external terminal, and the telematics center 200 via a mobile communication network that is constructed according to technical standards for mobile communication or communication methods (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSDPA), long term evolution (LTE), long term evolution-advanced (LTE-A), and the like). The radio signals may include various types of data based on transmission/reception of voice call signals, video call signals, and letters/multimedia messages.

The position information reception unit 120 serves to acquire a position (e.g., current position) of the AVN terminal 100. For example, a position of the AVN terminal 100 may be acquired as the position information reception unit 120 receives singles transmitted from GPS satellites. Meanwhile, the AVN terminal 100 may have Wi-FI, Bluetooth, and Wi-Fi direct functions.

The display 130 may include at least one selected from among a liquid crystal display (LCD), a thin film transistor-liquid crystal display (TFT-LCD), an organic light emitting diode (OLED), a flexible display, a three-dimensional (3D) display, and e-ink display. In addition, two or more displays 130 may be present in some embodiments of the AVN terminal 100. In this case, the mobile terminal 100 may include plural displays that are spaced apart from one another or integrally arranged in a single plane, or are arranged respectively in different planes. The display 130 may include a touch sensor to sense a touch to the display 130 so as to receive a control command in a touch manner. As such, upon occurrence of a touch to the display 130, the touch sensor may sense the touch and the controller 150 may generate a control command corresponding to the touch. Content input via touch may be letters or numerals, or menu items that may be indicated or designated in various modes The memory 140 stores data to assist various functions of the AVN terminal 100. The memory 140 may store a number of applications that are driven in the AVN terminal 100, and data and commands for operation of the AVN terminal 100. At least some applications may be downloaded from an external center via wireless communication. In addition, at least some applications may be preinstalled in the AVN terminal 100 for basic functions of the AVN terminal 100. Meanwhile, the applications may be stored in the memory 140 and installed in the AVN terminal 100 so as to be driven by the controller 150 to perform an operation (or functions) of the AVN terminal 100

The memory 140 may store programs to operate the controller 150, and temporarily store input/output data. The memory 140 may store data related to various patterns of vibrations and sound output upon input of a touch to a touchscreen. The memory 140 may include at least one storage medium selected from among a flash memory type memory, a hard disk type memory, a solid state disk (SSD) type memory, a silicon disk drive (SDD) type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like). The AVN terminal 100 may be operated in connection with a web storage that performs a storage function of the memory 140 in the Internet.

The controller 150 typically controls general operations of the AVN terminal 100 in addition to operations related to the applications. The controller 150 may process signals, data, and information input or output via the aforementioned components, or drive applications stored in the memory 140, thereby providing or processing information or functions suitable for a user. The controller 150 may receive current position information of the telematics terminal via the position information reception unit 120. The current position information may be acquired via GPS reception.

The telematics center 200 may perform communication with a second mobile terminal 400 (e.g., 3G/LTE, etc.). The telematics sensor 200 may transmit information received from the second mobile terminal 400 to the AVN terminal 100.

The first mobile terminal 300 may perform communication with the AVN terminal 100 via Bluetooth or USB. In addition, the first mobile terminal 300 may transmit a remote control command to the AVN terminal 100 by way of the telematics center 200 using a telematics linkage application. Examples of the remote control command include a remote start command, a remote air conditioning command, remote door lock and unlock commands, and the like.

Figure 2:
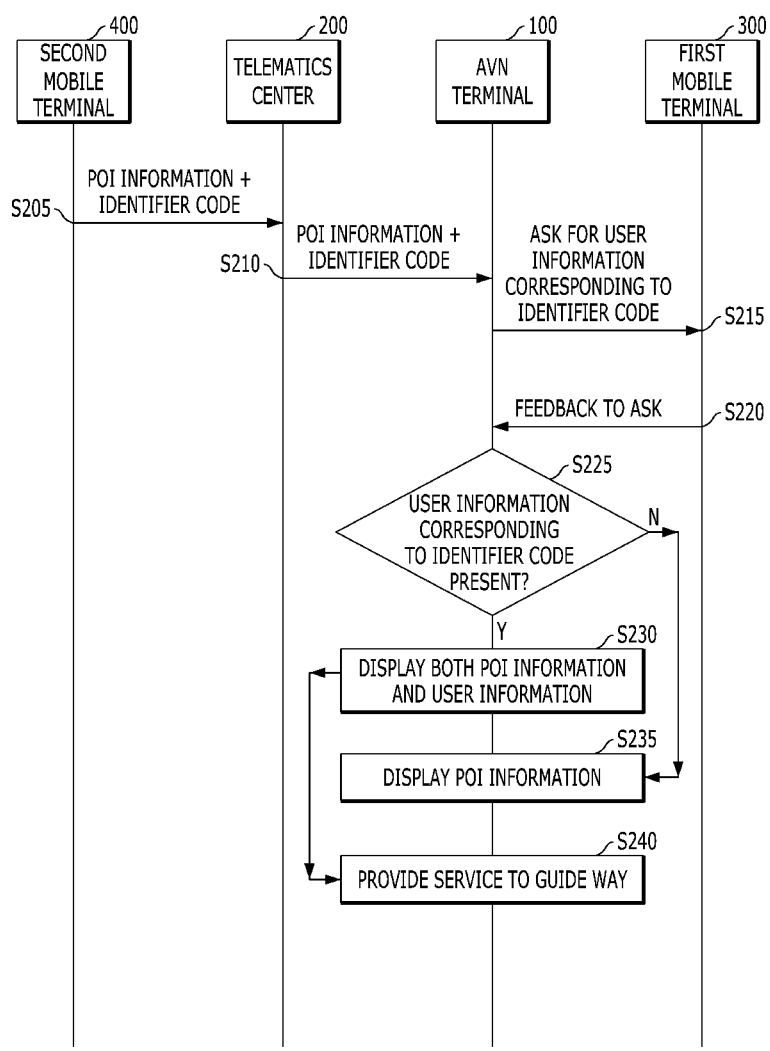
FIG. 2 is a sequence view of a control method of an AVN terminal that provides a POI service according to embodiments of the present disclosure.

FIG. 2 is a sequence view of a control method of an AVN terminal that provides a POI service according to embodiments of the present disclosure. Reference numerals in the following description will be understood with reference to FIGS. 1 and 2.

First, the controller 150 receives identifier code and POI information from the outside (S205 and S210). More specifically, the controller 150 may receive identifier code and POI information from the external telematics center 200 (S210).

In addition, the controller 150 may directly receive identifier code and POI information from the external mobile terminal 400 (S205). The controller 150 may receive the corresponding information from the external mobile terminal 400 via mobile communication. Herein, assuming that the external mobile terminal 400 communicates with the AVN terminal 100 by way of the telematics center 200.

The identifier code may include a media access control (MAC) address, social networking service (SNS) ID, and telephone number of the external mobile terminal. The SNS ID may be a messenger ID or SNS service connection ID.

The POI information may include a name, sex information, and birth date information of a user (who owns the external mobile terminal 400). As such, it is possible to allow a user who uses the AVN terminal 100 (e.g., a user who uses the first mobile terminal 300) to clearly know a POI provider, which improves user convenience of the AVN terminal 100. In addition, providing the user of the AVN terminal 100 with a name of the POI provider may assist the user in receiving a service without fear, which may improve device security and effectiveness.

Next, the controller 150 asks the first mobile terminal 300 user information corresponding to the identifier code of the second mobile terminal 400 (S215). The controller 150 may perform communication with the first mobile terminal 300 via wireless/wired communication, such as Bluetooth communication, Wi-Fi communication, Wi-Fi direct communication, or USB communication. Generally, an owner of the first mobile terminal 300 may be identical to the user of the AVN terminal 100.

In this case, the first mobile terminal 300 may search for user information corresponding to the identifier code from a phone database included in the first mobile terminal 300. The phone database may include CarPlay information in the case of an iPhone and include GPM information in the case of an Android phone. The phone database may include phonebook information.

Thereafter, when the controller 150 determines that user information corresponding to the identifier code is present (e.g., the user information corresponding to the identifier code was identified during searching) (S225), the controller 150 may display both POI information and user information through the display 130 (S230). Here, the AVN terminal 100 may further include an audio module and the controller 150 may output POI information and user information via audio. In addition, the controller 150 may display POI information and user information through a head-up display (HUD).

Next, the controller 150 may provide a service to guide the way to a destination while displaying the POI information and user information. In addition, when no user information is present (e.g., no user information corresponding to the identifier code was identified during searching), the controller 150 may display only POI information through the display 130.

Figure 3:
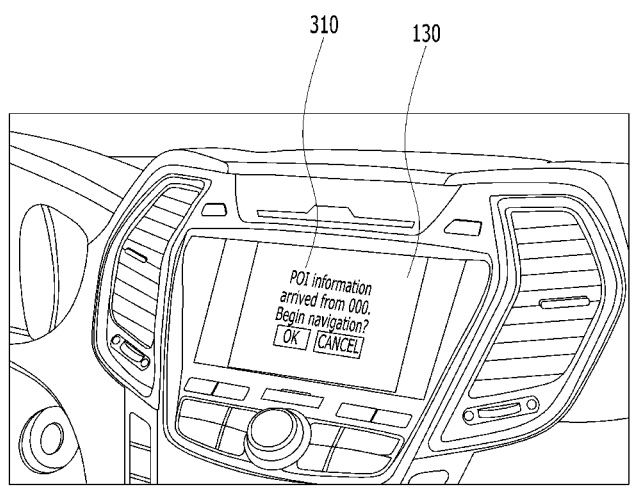
FIG. 3 is a view showing a display of an AVN terminal that displays information related to a POI provider when POI is provided to the AVN terminal according to embodiments of the present disclosure.

FIG. 3 is a view showing a display of an AVN terminal that displays information related to a POI provider when POI is provided to the AVN terminal according to embodiments of the present disclosure. As shown in FIG. 3, the controller 150 may await user input regarding whether to guide the way to POI when a name '000' of a POI provider is given. Here, the controller 150 may provide a service to guide the way to POI when the user selects an OK button.

Meanwhile, while the AVN terminal 100 has been described herein as receiving user information corresponding to identifier code from the first mobile terminal 300, the AVN terminal 100 may first download a phonebook and a phone database from the first mobile terminal 300 and, thereafter, search for user information corresponding to identifier code without aid of the first mobile terminal 300.

Accordingly, the above detailed description is not intended to be construed to limit the present disclosure in all aspects and be considered by way of example. The scope of the present disclosure should be determined by reasonable interpretation of the accompanying claims and all equivalent modifications made without departing from the present disclosure should be included in the following claims.

As is apparent from the above description, according to embodiments of the present disclosure, improved user convenience may be accomplished by additionally displaying information related to a POI provider on an AVN terminal.

It will be appreciated by persons skilled in the art that the effects that can be achieved through the present invention are not limited to what has been particularly described hereinabove and other advantages of the present disclosure will be more clearly understood from the above detailed description. Furthermore, it will be apparent to those skilled in the art that various modifications and variations can be made in the present disclosure without departing from the spirit or scope of the disclosure. Thus, it is intended that the present disclosure covers the modifications and variations of the embodiments herein provided they come within the scope of the appended claims and their equivalents.

What is claimed is:

1. A control method for an audio-video-navigation (AVN) terminal, the method comprising:
   receiving an identifier code and point of interest (POI) information from an external telematics center, wherein the identifier code indicates a provider of the POI information;

searching for user information corresponding to the identifier code received from the external telematics center, from a first external mobile terminal connected with the AVN terminal;

outputting first information corresponding to the POI information and the user information searched from the first external mobile terminal when the user information corresponding to the identifier code is identified from the first external mobile terminal during the searching, for setting a POI indicated by the POI information as a navigation destination; and outputting second information corresponding to the POI information without the user information when no user information corresponding to the identifier code is identified from the first external mobile terminal during the searching, for setting the navigation destination.

2. The control method according to claim 1, wherein the receiving comprises directly receiving the identifier code and the POI information from a second external mobile terminal.

3. The control method according to claim 1, wherein the searching comprises searching for the user information corresponding to the identifier code based on information stored in a phonebook or phone database provided in the first external mobile terminal.

4. The control method according to claim 1, wherein the identifier code includes at least one of a media access control (MAC) address, social networking service (SNS) ID, and telephone number of an external mobile terminal.

5. The control method according to claim 1, wherein the user information includes at least one of a name, sex information, and birth date information of a user.

6. An AVN terminal comprising:
a display;
a modem unit configured to receive an identifier code and POI information from an external telematics center, wherein the identifier code indicates a provider of the POI information; and
a controller configured to search for user information corresponding to the identifier code received from the external telematics center, from a first external mobile terminal connected via the modem unit and to control the display to output first information corresponding to the POI information and the user information searched from the first external mobile terminal when the user information corresponding to the identifier code is identified from the first external mobile terminal during the searching, for setting a POI indicated by the POI information as a navigation destination, and to output second information corresponding to the POI information without the user information when no user information corresponding to the identifier code is identified from the first external mobile terminal during the searching, for setting the navigation destination.

7. The AVN terminal according to claim 6, wherein the controller is further configured to directly receive the identifier code and the POI information from a second external mobile terminal.

8. The AVN terminal according to claim 6, wherein the controller is further configured to search for the user information corresponding to the identifier code based on information stored in a phonebook or phone database provided in the first external mobile terminal.

9. The AVN terminal according to claim 6, further comprising a head-up display (HUD),
wherein the controller is further configured to display the POI information and the user information via the HUD.

10. The AVN terminal according to claim 6, wherein the identifier code includes at least one of a media access control (MAC) address, SNS ID, and telephone number of an external mobile terminal.

11. The AVN terminal according to claim 6, wherein the user information includes at least one of a name, sex information, and birth date information of a user.

12. A non-transitory computer readable medium containing program instructions for a control method for an AVN terminal, comprising:
program instructions that receive an identifier code and point of interest (POI) information from an external telematics center, wherein the identifier code indicates a provider of the POI information;
program instructions that search for user information corresponding to the identifier code received from the external telematics center, from an external mobile terminal connected with the AVN terminal;
program instructions that output first information corresponding to the POI information and the user information searched from the first external mobile terminal when the user information corresponding to the identifier code is identified from the first external mobile terminal during the searching, for setting a POI indicated by the POI information as a navigation destination; and
program instructions that output second information corresponding to the POI information without the user information when no user information corresponding to the identifier code is identified from the first external mobile terminal during the searching, for setting the navigation destination.

* * * * *